United States Patent [19]

Billgren et al.

[11] 4,265,700

[45] May 5, 1981

[54] METHOD OF SEPARATING A SOLID AND A LIQUID PHASE OF A MASS

[75] Inventors: Per A. Billgren, Söderfors; Stig A. Karlsson, Tierp; both of Sweden

[73] Assignee: Uddeholms Aktiebolag AB, Hagfors, Sweden

[21] Appl. No.: 61,292

[22] PCT Filed: May 9, 1979

[86] PCT No.: PCT/SE/78/00029

§ 371 Date: May 9, 1979

§ 102(e) Date: May 9, 1979

[87] PCT Pub. No.: WO 79/00137

PCT Pub. Date: Mar. 23, 1979

[30] Foreign Application Priority Data

Sep. 9, 1977 [SE] Sweden ............................. 7710126

[51] Int. Cl.³ .......................... B01D 1/00; C22B 1/00; C22B 7/00; F26B 3/00
[52] U.S. Cl. .................................... 159/47 R; 34/26; 34/30; 208/13; 209/11; 210/774
[58] Field of Search ................. 266/901; 175/66, 206; 34/201, 209, 215, 42, 26, 30; 210/71, 180, 187; 209/11; 208/13, 11 R, 179, 184, 186; 83/923; 159/22, 23, 29, 47 R, 47 WL

[56] References Cited

U.S. PATENT DOCUMENTS 2,483,937  10/1949  Rosenblum .......................... 208/186
3,790,474  2/1974   Moffit ................................ 208/179

FOREIGN PATENT DOCUMENTS 276664   7/1914  Fed. Rep. of Germany .
1814471  6/1970  Fed. Rep. of Germany .
2532689  1/1977  Fed. Rep. of Germany .
657249   6/1965  France .
340592  11/1971  Sweden .

Primary Examiner—Frank Sever
Attorney, Agent, or Firm—Murray and Whisenhunt

[57] ABSTRACT

This specification describes a method of separating a fine-grained close-packed solid material from a liquid with which the fine-grained material is saturated. The material may by way of example consist of grindings; metal-containing pickling bath deposits; or metal oxides from metallurgical venturi-filter. The moist mixture (1) is packed in a container (2) which thereafter is closed and heated from underneath. The liquid is evaporated starting from the lower portions in the container and forces liquid from the upper portions towards the surface of the paste-like mixture, wherefrom collected liquid (9) can be removed. Common oil drums can be used as containers. When the liquid has been removed the containers with enclosures can be charged in metallurgical furnaces or can the material be dumped together with waste material without any effects detrimental to the environment.

5 Claims, 2 Drawing Figures

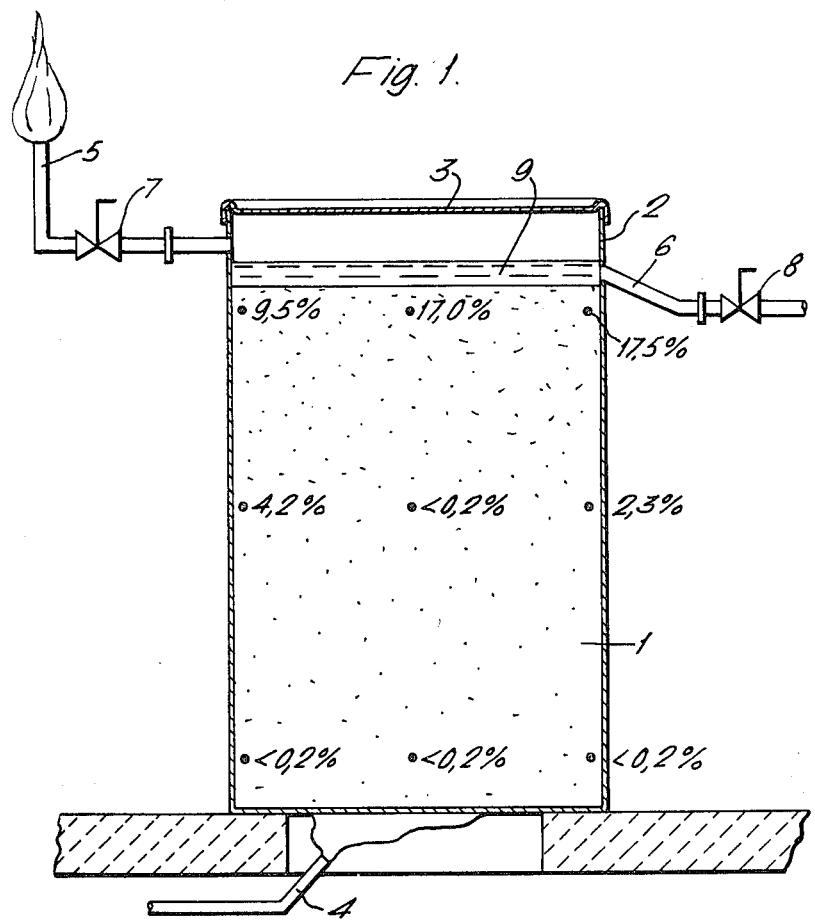

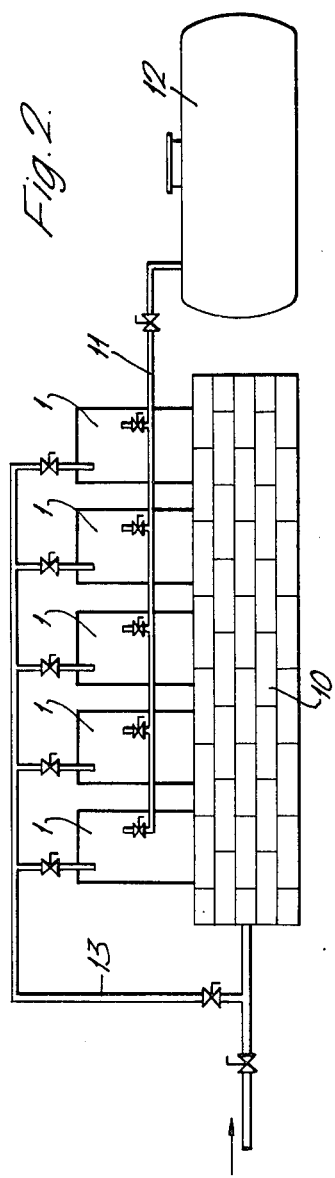

METHOD OF SEPARATING A SOLID AND A LIQUID PHASE OF A MASS

The present invention relates to a method of separating a fine-grained close-packed solid material from a liquid with which the fine-grained material is saturated. The fine-grained material in some cases may consist of metal compounds substantially without any value, e.g. certain pickling bath products which are harmless as far as the enviroment is concerned but where the liquid phase can be highly toxic or from other reasons harmful to the environment. In other cases the fine-grained material can be more valuable so that it is desired to take care of it. This concerns as well certain kinds of pickling bath deposits as certain metal oxides in the form of powder from venturi-filters in metallurgical plants. Another material which advantageously can be treated according to the invention is obtained at the machining of objects of high speed steel and other high grade alloys. In such machining there is often used grinding operations in combinations with cutting oils or other liquids or chemicals. At these operations there is formed very fine-grained grindings soaked in a liquid phase, such as oil or an oil emulsion. In the present art it does not exist any practical useful method of taking care of these grindings, although they represent a high value in the form of alloying metals. To the contrary the taking care of this material has created a complicated waste- and environmental problem.

It is often desirable to be able to remelt the metal content in waste material of the kind above described in metallurgical furnaces. This is, however, impossible according to the present art in the first place because of the following three reasons:

If the material is charged freely in the furnace, liquid will pour down into the bottom of the furnace and cool and soak the bottom so that crackings will be formed in the lining of the furnace;

If the liquid saturated material is charged in the furnace in closed containers the volatile constituents will be evaporated which under unfavourable conditions may cause puffs and explosions;

the large liquid volume brings about a lot os smoke which has an unfavourable impact on inner and outer environment.

It is therefore a first object of the present invention to separate a fine-grained close-packed solid material from a liquid with which the fine-grained material is saturated so that the solid material can be taken care of in a desired way. More particularly, there is an object in the case when the liquid phase is toxic or in any other way harmful to the environment, while the solid phase is harmless from environmental point of view but on the other hand without any important economical value, to be able to dump the solid material together with other waste material. In the case when the solid phase to the contrary contains valuable elements, e.g. valuable alloying elements, it is an object of the invention to remove the liquid so that the solid material can be taken care of, e.g. by charging the material on metallurgical furnaces. Still another object also is to be able to separate the liquid from the liquid saturated mass in order to be able to re-use the liquid. These and other objects can be achieved therein that the mass is collected in a container; that the mass collected in the container is heated from underneath so that the liquid, starting in the lower portion of the mixture, is evaporated in an evaporation zone and forces the liquid in the upper parts of the mass upwards through the mass towards the surface where the liquid is collected and wherefrom the liquid is removed from the container. In order that the liquid, when it is combustible, will not be set fire to, the heating is carried out without any air admission. During the latter stage of the process the remaining liquid will be so hot that some smoke can be developed when the liquid consists or contains oil or corresponding agents. This smoke or gas can be burnt by means of a safety flame or be used for heating the container.

The method of the invention is based upon the following principles:

(a) a sufficiently great gas pressure shall be established in the lower portions of the paste-like mass by heating the container from underneath in order that the gas will force the liquid upwards at a certain desired rate. This condition may be expressed $$dv/dt = A \cdot \alpha \cdot (dp/dy) \tag{1}$$

where the following definitions apply
  $dv/dt$ = Volume flow of liquid
  $A$ = Horizontal section area
  $\alpha$ = permeability
  $dp/dy$ = pressure gradient in vertical direction (b) The grain size, or more correctly the close-packing degree, shall be such that gas bubbles may not essentially proceed upwards and liquid drops not essentially fall downwards in the space between the grains (the particles). Agitation of the liquid in other words shall be prevented by the capillary forces in the fine divided mixture. It is herein presumed that a gas bubble having a tendency to proceed upwards is subjected to two forces in the critical moment when it shall be cut off, namely the net lift which is directed upwards and the surface tension which works as a downwards directed force. A liquid drop which is being cut and will fall downwards is influenced in an inversely way. If the channels between the particles in the mixture are smaller than the radius of the critical gas bubbles and the drops respectively, agitation of the liquid is consequently prevented.

The force of gravity $F_T = 4/3 \pi r^3 \cdot (\rho \text{ liquid} - \rho \text{ gas}) \cdot g$.
Surface tention force $F_Y = \alpha \cdot 2\pi r$.

At the critical smallest bubble- or drop radius $F_T = F_Y$. The critical smallest bubble- or drop radius, $r_{crit}$, which defines the desired lowest close-packing degree, hence is $$r_{crit} = \sqrt{\frac{3}{2} \cdot \frac{\alpha}{(\rho_{liquid} - \rho_{gas}) \cdot g}} \tag{2}$$

where the following definitions apply
  $r$ = bubble radius
  $\alpha$ = surface tention liquid - gas
  $\rho$ = density
  $g$ = acceleration of gravity The close-packing degree thus should be such that the smallest breadth of the channels between the particels will not exceed the double critical radius $r_{crit}$.

(c) The gas pressure $P_{gas}$ in the bottom of the vessel shall be higher than the hydrostatic pressure of the liquid but lower than the hydrostatic pressure of the entire bulk of the paste-like mixuture above the gas volume. Otherwise gas will proceed through the mixture from lower regions. This gives the expression:

$$P_{atm}+\rho_{liquid}\cdot g\cdot(h_1+h_2)<P_{gas}<P_{atm}+\rho_{mixture}\cdot g\cdot h_2+\rho_{liquid}\cdot g\cdot h_1 \quad (3)$$

where
 $h_1$ = the height of the liqud volume collected on the surface of the mass
 $h_2$ = the height of the liquid saturated mass By combining the expression (3) with the equation (1) the maximum separation rate can be calculated.

According to a developed embodiment of the invention it is also offered a method of separating liquid from the solid material through an essentially continuous process. It is also an object of this embodiment to obtain a still further improved economy as far as heat energy is concerned and preferably also to obtain a higher cleanliness of the products through an essentially continuous counter-current process.

Further it is an object of still another developed embodiment of the invention further to increase the "maximal" separation rate. According to the embodiment of the invention this is carried out by increasing the gas pressure gradient in the vertical direction in the mass by increasing the difference between the gas pressure $P_{gas}$ in the lower portion of the mass and the pressure upon the solid phase on the upper surface of the mass to exceed what is obtained by the heating. This may be obtained by applying an outer pressure $P_y$ upon the solid phase from above, e.g. by pressing a screen cloth against the solid phase, said screen cloth being permeable to the liquid but not to the solid phase. Another method is vacuum suction on the top of the container, i.e. vacuum suction from the space of the container above the surface of the mass. These two alternatives may also be combined. Equation (3) therefore can be extended according to (4):

$$P_{vacuum}+\rho_{liquid}\cdot g(h_1+h_2)<P_{gas}<P_y+P_{vacuum}+\rho_{mass}-gh_2+\rho_{liquid}\cdot gh_1 \quad (4)$$

By one or both of these means the pressure difference between the gas pressure $P_{gas}$ in the evaporation zone in the lower portion of the mass and the pressure upon the solid phase on the surface of the mass will increase. At the same time the evaporation point will be influenced in a favourable direction.

The invention will now be more closely described by reference to some preferred embodiments. Herein there will be referred to the accompanying drawings, which schematically illustrate the principles of the embodiments.

FIG. 1 shows a container containing a liquid containing mass, from which the liquid phase is being separated from the solid phase.

FIG. 2 shows a row of containers the liquid content of which is being separated.

Referring first to FIG. 1 a jelly mass of metal containing particles soaked in a liquid is generally shown as 1. In the case when the metal containing particles consist of metal oxides obtained from venturi filters from metallurgical furnaces or of metal compounds from pickling baths the particles normally have "microscopic" sizes in the order of 10 μm or smaller. In the case when the particles consist of grindings the majority of the grindings have sizes varying from very small, comparatively round particles having sizes in the order of about $\phi$ 5 μm to somewhat larger, usually elongated particles having sizes of about 150×20μm. This mixture of fine particles and liquid provides a mass 1 having a characteristic jelly consistency. The mass 1 is collected in a container 2 which according to the embodiment consists of a conventional oil drum of the kind which is normally used as transport containers for the present "waste product". The container 2 is hermetically closed by a cover 3. A burner 4 is provided underneath the container for heating the content of the container 2. According to the illustrated embodiment the burner is a gas burner which makes it possible in a practical way to take care of also combustible gases obtained at the process for the heating. Also other heating methods, of course, are conceivable, such as for example heating by means of an oil burner which has advantageously been used during performed experiments. Also electric heating principally is conceivable. Numeral 5 designates a conduit, for the escape of combustible gas. A spillway is designated 6. Closing valves in the gas conduit and in the spillway 6 has been designated 7 and 8 respectively. Liquid which successively is collected on the surface of the mass has been designated 9.

Although this has been proven not to be necessary during normal conditions it is possible to separate the upper portion of the partially dried mass from the bottom and middle portions and transfer the former portion to a new container for continued expel of liquid. Herein it is possible to obtain a mass which is practically free from liquid. The invention may be illustrated through the following example.

EXAMPLE 1

An oil drum containing 110 l of a mass consisting of grindings of high speed steel soaked in cutting oil was heated from underneath by means of an oil burner. The oil content in the container at the start of the experiment was 32.5 weight percent. After 10 hours the oil content in the bottom portion of the vessel had decreased to less than 0.2%, i.e. this part of the container was practically free from oil. Also the center of the mass essentially had been de-oiled while the outer portions at a level indicated in FIG. 1 had been decreased to 4.2 and 2.4 % respectively. In the upper part of the mass the oil content in the centre was 17.0% and in the outer portions 9.5 and 15% respectively. The sampling points have been indicated in FIG. 1. At the top there was an oil bed which was drained off through the spillway 6. At the end of the de-oiling there was formed a hot oil smoke which was led off through the conduit 5 and was burnt in a safety flame.

A number of containers consisting of conventional oil drums were de-oiled in this way. Thereafter the containers with enclosures were melted in a 30 tons electric arc furnace in quantities up to 2 tons per charge. 1.5 tons per charge was shown to be a suitable quantity corresponding to 5% of the total charge of raw materials. There were no tendencies to puffs, risks for accelerated lining wear or considerable development of smoke.

EXAMPLE 2

In this case the mass 1 consisted of sludge consisting of precipitated metal compounds. These very small particels substantially consisting of iron compounds. The liquid was an aqueous solution. This mass which contained about 45% water was heated in an oil drum according to the invention in the way illustrated in FIG. 1. The aqueous solution 9 which successively was collected on the upper surface was drained off, whereafter the essentially dried material could be dumped together with other waste material without causing any harmful impact on the environment.

FIG. 2 schematically shows a production plant for the carrying out of the method according to the embodiment of the invention illustrated in FIG. 1. The containers 1 are arranged on a common hearth 10 as is shown in the figure. The separated liquid is conveyed through a conduit 11 to a collecting vessel 12. Gas which is formed at the separtion of liquid is utilized in the case it is combustible according to the embodiment for the heating in the hearth 10 and is for this purpose fed through a conduit 13.

We claim:

1. A method of separating a fine-grained close-packed solid material from a liquid with which the fine-grained solid material is saturated, said process comprising:
   (a) collecting a mass of said fine-grained solid material saturated with said liquid in a container which is closed to the entry of air while in operation,
   (b) heating the mass in the container from underneath to force the liquid in the upper part of said mass upwards through the mass towards the upper surface thereof by evaporating said liquid in an evaporation zone starting in the lower part of the mass,
   (c) collecting the liquid at the upper part of the mass and discharging the liquid from the container,
   (d) moving the evaporation zone successively upwards in the mass by continued heating of said container from underneath, and
   (e) discharging gas obtained above the surface of said mass from the container, and
   (f) controlling the heating of (b)
      (1) such that the gas pressure Pgas in the lower part of the mass is higher than the hydrostatic pressure exerted by the mass, to satisfy the expression $$P_{atm} + \rho_{liquid} \cdot g \cdot (h_1 + h_2) < P_{gas} < P_{atm} + \rho_{mass} \cdot g \cdot h_2 + \rho_{liquid} \cdot g \cdot h_1$$

where $\rho$ indicates density, g indicates gravity acceleration, $h_1$ indicates the height of liquid collected on the surface of the mass and $h_2$ indicates the height of the liquid saturated parts of the mass, and
      (2) so as to satisfy the expression $$dv/dt = A \cdot \alpha \cdot (dp/dy)$$

where
A = horizontal section area
$\alpha$ = permeability
dp/dy = pressure gradient in a vertical direction.

2. Method according to claim 1, wherein the grain size and degree of close packing of said solid material in said mass is such that gas bubbles essentially cannot proceed upwards and liquid drops essentially cannot fall downwards in the mass during liquid separation.

3. Method of claim 1 or claim 2, wherein the degree of close packing is such that the smallest width of the channels between the solid particles does not exceed the double critical radius $r_{crit}$ according to the expression $$r_{crit} = \sqrt{\frac{3}{2} \frac{\alpha}{(liquid - gas) \cdot g}}$$

where
r = gas bubble radius
$\alpha$ = surface tension of the liquid - gas system.

4. Method according to any one of claims 1 or 2, wherein said liquid is a liquid which is at least partly combustible, and the gases discharged from said container are fed off and burned.

5. Method according to claim 4, wherein said gases which are burned are used to heat said container.

* * * * *